(12) United States Patent
Ben Noon et al.

(10) Patent No.: US 11,458,911 B2
(45) Date of Patent: Oct. 4, 2022

(54) OS MONITOR

(71) Applicant: ARGUS CYBER SECURITY LTD., Tel Aviv (IL)

(72) Inventors: Ofer Ben Noon, Tel Aviv (IL); Yaron Galula, Kadima (IL); Oron Lavi, Kfar Saba (IL)

(73) Assignee: ARGUS CYBER SECURITY LTD., Tel Aviv (IL)

(*) Notice: Subject to any disclaimer, the term of this patent is extended or adjusted under 35 U.S.C. 154(b) by 344 days.

(21) Appl. No.: 16/217,079

(22) Filed: Dec. 12, 2018

(65) Prior Publication Data

US 2019/0111863 A1  Apr. 18, 2019

Related U.S. Application Data

(63) Continuation of application No. 14/590,042, filed on Jan. 6, 2015.

(Continued)

(51) Int. Cl.
*B60R 16/023* (2006.01)
*H04L 29/06* (2006.01)
(Continued)

(52) U.S. Cl.
CPC ............ *B60R 16/023* (2013.01); *B60R 25/00* (2013.01); *G06F 11/30* (2013.01); *G06F 21/55* (2013.01);
(Continued)

(58) Field of Classification Search
CPC ....... B60R 16/023; B60R 25/00; G06F 11/30; G06F 21/55; G06F 21/554; G06F 21/606; G06F 21/6281; H04L 12/4625; H04L 63/0227; H04L 63/14; H04L 63/1408; H04L 63/1416; H04L 63/1425; H04L 63/1441; H04L 67/12
See application file for complete search history.

(56) References Cited

U.S. PATENT DOCUMENTS 5,764,919 A   6/1998   Hashimoto
6,314,351 B1  11/2001  Chutorash
(Continued)

FOREIGN PATENT DOCUMENTS

EP   2323061    5/2011
JP   10243004   9/1998
(Continued)

OTHER PUBLICATIONS

U.S. Final Office Action dated Apr. 10, 2020 for U.S. Appl. No. 15/706,717, filed Sep. 17, 2017.
(Continued)

*Primary Examiner* — Yonas A Bayou
(74) *Attorney, Agent, or Firm* — A.C. Entis-IP Ltd.; Allan C. Entis

(57) ABSTRACT

An in-vehicle communication network comprising a bus and at least one node connected to the bus; an in-vehicle network operating system (OS) that manages OS processes, to enable a processor to run the processes and execute their respective process codes; and a module hosted in the OS that is configured to monitor the OS and vet a process that the OS enables for running by a processor to determine if the process is potentially damaging.

9 Claims, 5 Drawing Sheets

Related U.S. Application Data

(60) Provisional application No. 61/923,790, filed on Jan. 6, 2014, provisional application No. 61/927,515, filed on Jan. 15, 2014, provisional application No. 62/038,859, filed on Aug. 19, 2014, provisional application No. 62/038,856, filed on Aug. 19, 2014.

(51) Int. Cl.

| | | |
|---|---|---|
| *G06F 21/55* | (2013.01) | |
| *G06F 11/30* | (2006.01) | |
| *H04L 12/46* | (2006.01) | |
| *H04L 29/08* | (2006.01) | |
| *G06F 21/60* | (2013.01) | |
| *B60R 25/00* | (2013.01) | |
| *G06F 21/62* | (2013.01) | |
| *H04L 9/40* | (2022.01) | |
| *H04L 67/12* | (2022.01) | |
| *H04L 12/40* | (2006.01) | |

(52) U.S. Cl.
CPC .......... *G06F 21/554* (2013.01); *G06F 21/606* (2013.01); *G06F 21/6281* (2013.01); *H04L 12/4625* (2013.01); *H04L 63/0227* (2013.01); *H04L 63/14* (2013.01); *H04L 63/1408* (2013.01); *H04L 63/1416* (2013.01); *H04L 63/1425* (2013.01); *H04L 63/1441* (2013.01); *H04L 67/12* (2013.01); *H04L 63/123* (2013.01); *H04L 2012/40215* (2013.01); *H04L 2012/40273* (2013.01)

(56) References Cited

U.S. PATENT DOCUMENTS

| | | | |
|---|---|---|---|
| 7,146,260 | B2 | 12/2006 | Preston et al. |
| 7,269,675 | B2 | 9/2007 | Dalakuras et al. |
| 7,356,832 | B1 | 4/2008 | Eibach et al. |
| 7,734,382 | B2 | 6/2010 | Flick |
| 7,797,737 | B2 | 9/2010 | Eibach et al. |
| 7,882,538 | B1 | 2/2011 | Palmer |
| 7,917,261 | B2 | 3/2011 | Melman |
| 8,103,407 | B2 | 1/2012 | Melman |
| 8,327,442 | B2 | 12/2012 | Herz et al. |
| 8,351,454 | B2 | 1/2013 | Jain et al. |
| 8,402,268 | B2 | 3/2013 | Dierickx |
| 8,583,292 | B2 | 11/2013 | Preston et al. |
| 8,601,595 | B2 | 12/2013 | Gelvin et al. |
| 8,856,936 | B2 | 10/2014 | Datta Ray et al. |
| 8,903,593 | B1 | 12/2014 | Addepalli et al. |
| 9,171,171 | B1 | 10/2015 | Deb et al. |
| 10,708,293 | B2* | 7/2020 | Galula ................ H04L 63/1416 |
| 10,951,728 | B2* | 3/2021 | Lepp ..................... H04L 67/566 |
| 10,974,669 | B2* | 4/2021 | Haga ................... H04L 12/4625 |
| 10,979,245 | B2* | 4/2021 | Ujiie ...................... H04B 1/3822 |
| 11,036,853 | B2* | 6/2021 | Kamir ..................... G06N 20/00 |
| 11,252,180 | B2* | 2/2022 | Galula ..................... B60R 25/10 |
| 11,271,727 | B2* | 3/2022 | David ..................... H04L 9/3242 |
| 11,277,427 | B2* | 3/2022 | Ben-Noon ........... G07C 5/0816 |
| 11,316,870 | B2* | 4/2022 | Bathurst ............... H04L 63/0209 |
| 11,323,548 | B2* | 5/2022 | Entelis ..................... H04L 69/04 |
| 11,329,953 | B2* | 5/2022 | Atad ..................... H04W 76/16 |
| 2002/0116509 | A1 | 8/2002 | DeLaHuerga |
| 2003/0037136 | A1 | 2/2003 | Labovitz et al. |
| 2003/0117298 | A1 | 6/2003 | Tokunaga et al. |
| 2004/0003231 | A1 | 1/2004 | Levenson et al. |
| 2006/0093144 | A1 | 5/2006 | Reinelt |
| 2006/0206940 | A1 | 9/2006 | Strauss et al. |
| 2008/0085689 | A1 | 4/2008 | Zellner |
| 2010/0071054 | A1 | 3/2010 | Hart |
| 2010/0125402 | A1 | 5/2010 | Bansal et al. |
| 2010/0162399 | A1 | 6/2010 | Sheleheda et al. |
| 2010/0179844 | A1 | 7/2010 | LaFergola et al. |
| 2010/0257605 | A1 | 10/2010 | McLaughlin et al. |
| 2011/0007897 | A1 | 1/2011 | Kodam et al. |
| 2011/0029644 | A1 | 2/2011 | Gelvin et al. |
| 2011/0078239 | A1 | 3/2011 | Heen et al. |
| 2011/0093639 | A1 | 4/2011 | Richards |
| 2011/0093701 | A1 | 4/2011 | Etchegoyen |
| 2011/0103390 | A1 | 5/2011 | Hall et al. |
| 2012/0254948 | A1 | 10/2012 | Kleve et al. |
| 2012/0277949 | A1 | 11/2012 | Ghimire et al. |
| 2013/0104231 | A1 | 4/2013 | Niner et al. |
| 2013/0227650 | A1 | 8/2013 | Miyake |
| 2013/0305357 | A1 | 11/2013 | Ayyagar et al. |
| 2013/0317668 | A1 | 11/2013 | Tarnutzer |
| 2014/0032800 | A1 | 1/2014 | Peirce et al. |
| 2014/0047255 | A1 | 2/2014 | Sasaki et al. |
| 2014/0081508 | A1 | 3/2014 | Iida et al. |
| 2014/0165191 | A1 | 6/2014 | Ahn et al. |
| 2014/0196025 | A1 | 7/2014 | Corinella |
| 2014/0230062 | A1 | 8/2014 | Kumaran |
| 2014/0247831 | A1 | 9/2014 | Messner |
| 2014/0283062 | A1 | 9/2014 | Kamthe |
| 2015/0020152 | A1* | 1/2015 | Litichever ........... H04L 63/0263 726/1 |
| 2015/0032291 | A1 | 1/2015 | Lowrey et al. |
| 2015/0052405 | A1 | 2/2015 | Maiolani et al. |
| 2015/0073647 | A1 | 3/2015 | Ubik et al. |
| 2015/0113638 | A1* | 4/2015 | Valasek ................. G06F 21/562 726/22 |
| 2015/0150124 | A1 | 5/2015 | Zhang et al. |
| 2015/0189474 | A1 | 7/2015 | Amrhein et al. |
| 2015/0217706 | A1 | 8/2015 | Nishiyama et al. |
| 2015/0271201 | A1 | 9/2015 | Ruvio et al. |

FOREIGN PATENT DOCUMENTS

| | | |
|---|---|---|
| JP | 2014168219 | 9/2014 |
| WO | 2008097202 | 8/2008 |
| WO | 2013014672 | 1/2013 |
| WO | 2013093591 | 6/2013 |
| WO | 2013144962 | 10/2013 |
| WO | 2014061021 | 4/2014 |
| WO | 2014199687 | 2/2017 |

OTHER PUBLICATIONS

Matsumoto, Tsutomu et al.; "A Method of Preventing Unauthorized Data Transmission in Controller Area Network" Vehicular Technology conference, 2012 IEEE 75th, IEEE, May 6, 2012, pp. 1-5.

Koscher, Karl et al., Experimental Security Analysis of a Modern Automobile, 2010 IEEE Symposium of Security and Privacy, pp. 1-16.

Müter, Michael et al., Entropy-Based Anomaly Detection for In-Vehicle Networks, 2011 IEEE Intelligent Vehicles Symposium (IV) Baden-Baden, Germany, Jun. 5-9, 2011, pp. 1110-1115.

Schweppe, Hendrik et al., Security and Privacy for In-Vehicle Networks, 2012 IEEE 1st International Workshop on Vehicular Communications, Sensing, and Computing (VCDC), pp. 12-17.

U.S. Final Office Action dated Dec. 27, 2018 for U.S. Appl. No. 14/590,042, filed Jan. 6, 2015.

U.S. Final Office Action dated Feb. 5, 2019 for U.S. Appl. No. 15/717,980, filed Sep. 28, 2017.

U.S. Final Office Action dated Feb. 5, 2019 for U.S. Appl. No. 15/675,813, filed Aug. 14, 2017.

U.S. Final Office Action dated Feb. 26, 2019 for U.S. Appl. No. 15/671,406, filed Aug. 8, 2017.

U.S. Final Office Action dated Mar. 14, 2019 for U.S. Appl. No. 15/706,717, filed Sep. 17, 2017.

U.S. Non-Final Office Action dated Jul. 9, 2019 for U.S. Appl. No. 15/675,813, filed Aug. 14, 2017.

U.S. Non-Final Office Action dated Aug. 7, 2019 for U.S. Appl. No. 15/671,406, filed Aug. 8, 2017.

European Search Report (extended) dated Mar. 27, 2015 for European Application No. 15150216.8 filed on Jan. 6, 2015.

International Search Report for PCT/IL2013/050838 dated Feb. 17, 2014.

(56) References Cited

OTHER PUBLICATIONS

Nilsson, D. et al.; "A Defense-in-Depth Approach to securing the Wireless vehicle Infrastructure"; Journal of Networks, vol. 4, No. 7, Sep. 2009, pp. 552-564.
Non-Final Office Action dated Feb. 20, 2015 for U.S. Appl. No. 14/590,022, filed Jan. 6, 2015.
Non-Final Office Action dated Mar. 13, 2015 for U.S. Appl. No. 14/590,027, filed Jan. 6, 2015.
Search Report received for European Patent application No. 15150157.4 dated Apr. 1, 2015, 8 pages.
Search Report received for European Patent application No. 15150180.6 dated Apr. 2, 2015, 8 pages.
Search Report received for European Patent application No. 15150216.8 dated Mar. 27, 2015, 8 pages.
Search Report received for European Patent application No. 15150195.4 dated Apr. 22, 2015, 6 pages.
Studnia, Ivan et al; "Survey on Security Threats and Protection Mechanisms in Embedded Automotive Networks", 2013 43rd annual IEEE/IFIP conference on dependable systems and networks workshop, Jun. 24, 2013, pp. 1-12.
Final Office Action dated Jun. 19, 2015 for U.S. Appl. No. 14/590,022, filed Jan. 6, 2015.
Non-Final Office Action dated Jun. 24, 2015 for U.S. Appl. No. 14/590,027, filed Jan. 6, 2015.
Final Office Action dated Nov. 6, 2015 for U.S. Appl. No. 14/590,027, filed Jan. 6, 2015.
Non-Final Office Action dated Apr. 5, 2016 for U.S. Appl. No. 14/590,038, filed Jan. 6, 2015.
Non-Final Office Action dated Apr. 19, 2016 for U.S. Appl. No. 14/590,022, filed Jan. 6, 2015.
Non-Final Office Action dated Mar. 10, 2016 for U.S. Appl. No. 14/590,027, filed Jan. 6, 2015.
Final Office Action dated Aug. 12, 2016 for U.S. Appl. No. 14/590,027, filed Jan. 6, 2015.
Final Office Action dated Aug. 22, 2016 for U.S. Appl. No. 14/590,038, filed Jan. 6, 2015.
Pallavi et al., Embedded on-board diagnostics system using CAN network, Wireless Computing and Networking (GCWCN), IEEE Global Conference Year 2014, pp. 31-35.
Zhang et al., Defending Connected Vehicles Against Malware; Challenges and a Solution Framework, IEEE Internet of Things Journal Year 2014, vol. 1, Issue 1, pp. 10-21.
Notice of Allowance dated Nov. 14, 2016 for Corresponding U.S. Appl. No. 14/590,022, filed Jan. 6, 2015.
Office Action dated Feb. 28, 2017 for U.S. Appl. No. 14/590,027, filed Jan. 6, 2015.
Office Action dated Mar. 22, 2017 for U.S. Appl. No. 14/590,038, filed Jan. 6, 2015.
Office Action dated Feb. 22, 2018 for U.S. Appl. No. 15/675,959, filed Aug. 14, 2017.
Office Action dated Feb. 23, 2018 for U.S. Appl. No. 15/706,715, filed Sep. 17, 2017.
Advisory Action dated Aug. 8, 2018 for corresponding U.S. Appl. No. 15/671,406, filed Aug. 8, 2017.
Final Office Action dated Jul. 11, 2018 for corresponding U.S. Appl. No. 15/706,715, filed Sep. 17, 2017.
Office Action dated Jun. 27, 2018 for corresponding U.S. Appl. No. 15/675,813, filed Aug. 14, 2017.
Office Action dated Jul. 17, 2018 for corresponding U.S. Appl. No. 15/706,717, filed Sep. 17, 2017.
Office Action dated Aug. 10, 2018 for corresponding U.S. Appl. No. 14/590,038, filed Jan. 6, 2015.
European Search Report dated Jun. 22, 2018 for Corresponding Application No. 17173679.6 filed May 31, 2017.
U.S. Office Action dated Sep. 27, 2018 for U.S. Appl. No. 15/671,406, filed Aug. 8, 2017.
U.S. Office Action dated Sep. 6, 2018 for U.S. Appl. No. 15/717,980, filed Sep. 28, 2017.
U.S. Final Office Action dated Sep. 6, 2018 for U.S. Appl. No. 15/675,959, filed Aug. 14, 2017.
Japanese Office Action dated Nov. 6, 2018 for Application No. 2018-146006 filed Aug. 2, 2018.
Office Action dated May 16, 2018 for corresponding U.S. Appl. No. 14/590,042, filed Jan. 6, 2015.
U.S. Non-Final Office Action dated Oct. 31, 2019 for U.S. Appl. No. 15/706,717, filed Sep. 17, 2017.
U.S. Final Office Action dated Nov. 25, 2019 for U.S. Appl. No. 15/675,813, filed Aug. 14, 2017.
U.S. Non-Final Office Action dated Feb. 1, 2021 for U.S. Appl. No. 15/706,717, filed Sep. 17, 2017.

* cited by examiner

OS MONITOR

RELATED APPLICATIONS

This application is a continuation of co-pending U.S. application Ser. No. 14/590,042 filed on Jan. 6, 2015, which claims benefit under 35 U.S.C. 119(e) of U.S. Provisional Applications 61/923,790 filed Jan. 6, 2014; and 61/927,515 filed Jan. 15, 2014; and 62/038,859 filed Aug. 19, 2014; and 62/038,856 filed Aug. 19, 2014 the disclosures of which are incorporated herein by reference.

FIELD

Embodiments of the disclosure relate to providing cyber security for in-vehicle communication networks.

BACKGROUND

Over the last half century the automotive industry has, initially slowly, and subsequently with great rapidity, been evolving from mechanical control systems for controlling a vehicle's functions to electronic "drive by wire" control systems for controlling the functions. In mechanical vehicular control systems a driver of a vehicle controls components of a vehicle that control vehicle functions by operating mechanical systems that directly couple the driver to the components via mechanical linkages. In drive by wire vehicle control systems a driver may be coupled directly, and/or very often indirectly, to vehicle control components that control vehicle functions by electronic control systems and electronic wire and/or wireless communication channels, rather than direct mechanical linkages. The driver controls the control components by generating electronic signals that are input to the electronic control systems and the communication channels.

Typically, a vehicular electronic control system comprises a user interface for receiving driver actions intended to control a vehicle function, transducers that convert the actions to electronic control signals, and a plurality of sensors and/or actuators that generate signals relevant to the function. An electronic control unit (ECU) of the control system receives the user generated signals and the signals generated by the sensors and/or actuators, and responsive to the signals, operates to control a vehicle component involved in performing the function. The ECU of a given control system may also receive and process signals relevant to performance of the function generated by, and/or by components in, other vehicle control systems. The sensors, actuators, and/or other control systems communicate with each other and the ECU of the given control system via a shared in-vehicle communication network, to cooperate in carrying out the function of the given control system.

By way of example, a vehicle throttle by wire control system that replaces a conventional cable between an accelerator pedal and an engine throttle may comprise an electronic accelerator pedal, an ECU also referred to as an engine control module (ECM), and an electronic throttle valve that controls airflow into the engine and thereby power that the engine produces. The electronic accelerator pedal generates electronic signals responsive to positions to which a driver depresses the pedal. The ECM receives the accelerator pedal signals, and in addition electronic signals that may be generated by other sensors, actuators, and electronic control systems in the vehicle that provide information relevant to the safe and efficient control of the engine via an in-vehicle communication network. The ECM processes the driver input signals and the other relevant signals to generate electronic control signals that control the throttle. Among the other sensors actuators, and electronic control systems that may provide relevant signals to the ECM over the in-vehicle network are, air-flow sensors, throttle position sensors, fuel injection sensors, engine speed sensors, vehicle speed sensors, brake force and other traction control sensors comprised in a brake by wire system, and cruise control sensors.

In-vehicle communication networks of modern vehicles are typically required to support communications for a relatively large and increasing number of electronic control systems of varying degrees of criticality to the safe and efficient operation of the vehicles. A modern vehicle may for example be home to as many as seventy or more control system ECUs that communicate with each other and sensors and actuators that monitor and control vehicle functions via the in-vehicle network. The ECU's may, by way of example, be used to control in addition to engine throttle described above, power steering, transmission, antilock braking (ABS), airbag deployment, cruise control, power windows, doors, and mirror adjustment. In addition, an in-vehicle network typically supports on board diagnostic (OBD) systems and communication ports, various vehicle status warning systems, collision avoidance systems, audio and visual information and entertainment (infotainment) systems and processing of images acquired by on-board camera systems. The in-vehicle network in general also provides access to mobile communication networks, WiFi and Bluetooth communications, TPMS (tire pressure monitor system) V2X (vehicle to vehicle communication), keyless entry system, the Internet, and GPS (global positioning system).

Various communication protocols have been developed to configure, manage, and control communications of vehicle components that are connected to and communicate over an in-vehicle communication network. Popular in-vehicle network communication protocols currently available are CAN (control area network), FlexRay, MOST (Media Oriented Systems Transport), Ethernet, and LIN (local interconnect network). The protocols may define a communication bus and how the ECUs, sensors, and actuators, generically referred to as nodes, connected to the communication bus, access and use the bus to transmit signals to each other.

The growing multiplicity of electronic control systems, sensors, actuators, ECUs and communication interfaces and ports, that an in-vehicle communication network supports makes the in-vehicle communication network, and the vehicle components that communicate via the communication system, increasingly vulnerable to cyber attacks that may dangerously compromise vehicle safety and performance.

SUMMARY

An aspect of an embodiment of the disclosure relates to providing a system, hereinafter also referred to as a global automotive security system (GASS), which operates to provide security to in-vehicle communication systems against cyber attacks for vehicles subscribed to GASS in a relatively extended geographical area. In an embodiment of the disclosure, GASS comprises a data monitoring and processing hub, hereinafter also referred to as a Cyber-Hub, and a module installed in a subscriber vehicle that communicates with the Cyber-Hub. The module may be referred to as a Cyber-Watchman or Watchman.

The Cyber-Watchman installed in a subscriber vehicle monitors communication traffic over at least a portion of an in-vehicle communication network of the vehicle to identify anomalies in the communication traffic that may indicate a disturbance in the normal operation of the network or vehicle. The disturbance may by way of example comprise a malfunction of any of the various components, that is, nodes, in the vehicle connected to the in-vehicle communication network and/or occurrence and/or consequence of a cyber attack on the communication network. In response to identifying an anomaly in communications over the in-vehicle communication network, the Cyber-Watchman may undertake any, or any combination of more than one, of various actions to report, mitigate, and/or control the anomaly.

In an embodiment, the Cyber-Watchman operates to transmit data, hereinafter also referred to as "Watchman data", to the Cyber-Hub responsive to communications traffic over the in-vehicle communications network that the Watchman monitors. The Cyber-Hub may process Watchman data from a subscriber vehicle to provide information for configuring the Watchman's monitoring of, and/or responding to detected anomalies in, communications over the vehicle's in-vehicle network. The Cyber-Hub, or a user, such a GASS agent or subscriber authorized to receive the information from the Cyber-Hub, may use the information to configure the Watchman.

In an embodiment of the disclosure, the Cyber-Hub processes Watchman data from a plurality of subscriber vehicles to determine if a vehicle or a fleet of vehicles may be under threat of an imminent cyber attack, is under a cyber attack, or has vulnerability to a cyber attack. In response to detecting an imminent, on-going, or vulnerability to, cyber attack, the Cyber-Hub may alert a GASS user to configure the Watchman or Watchmen of a subscriber vehicle or subscriber vehicles to engage the attack. Alternatively or additionally the Cyber-Hub may configure the Watchman or Watchmen directly by transmitting information to the Watchman or Watchmen over a suitable wire or wireless communication channel.

Optionally, the Cyber-Hub processes Watchman data from a plurality of Watchmen to generate measures of vehicle "health" for subscriber vehicles. The Cyber-Hub or a Watchman of a subscriber vehicle may use the measures of vehicle health to detect and anticipate mechanical and/or electronic malfunction of components and/or systems that the subscriber vehicle comprises. Optionally, the Watchman generates alarms to notify a driver of the vehicle, the Cyber-Hub, and/or a GASS agent or subscriber, that a vehicle malfunction is detected or anticipated. In an embodiment of the disclosure the Watchman may be configured to automatically invoke remedial measures to deal with the detected or anticipated malfunction.

By processing Watchman data from a plurality of Watchmen, the Cyber-Hub may benefit from improved statistics in providing measures and maintenance of vehicle health, and detecting vulnerability or exposure to Cyber attacks and providing early warnings and procedures for dealing with of such attacks.

In an embodiment, a Cyber-Watchman is a rule based module that operates in accordance with a set of rules to identify and classify messages transmitted over a subscriber vehicle's in-vehicle network and to determine what, if any, action or actions to undertake with respect to an identified message. The set of rules may autonomously determine how to process an identified message responsive to an operating context of the vehicle during which the message is transmitted over the in-vehicle network. The context may comprise an operating state of the vehicle and/or circumstances under which the vehicle is operating. An operating state of a vehicle may by way of example, comprise, vehicle speed, tire pressure, ambient temperature, vehicle load, and state of health. Circumstances under which the vehicle is operating may, by way of example, comprise road grade and/or traction, ambient temperature and/or humidity, and/or season. The operating context may comprise common operating state to which the Watchman is alerted by the Cyber-Hub. A common operating state is a state common to a plurality of subscriber vehicles at substantially a same time. A common operating state may be detected and defined by the Cyber-Hub from Watchman data transmitted to the Cyber-Hub by the Watchmen of the plurality of vehicles. A common operating state may for example, be defined as a state in which at substantially a same time the plurality of subscriber vehicles is subject to a same cyber attack, or subject to a same probability of failure of a vehicle control system or component. In an embodiment, the Cyber-Hub may configure the rule set of a Watchman in real time to engage and confront a possibly damaging common operating state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Figure 1A:
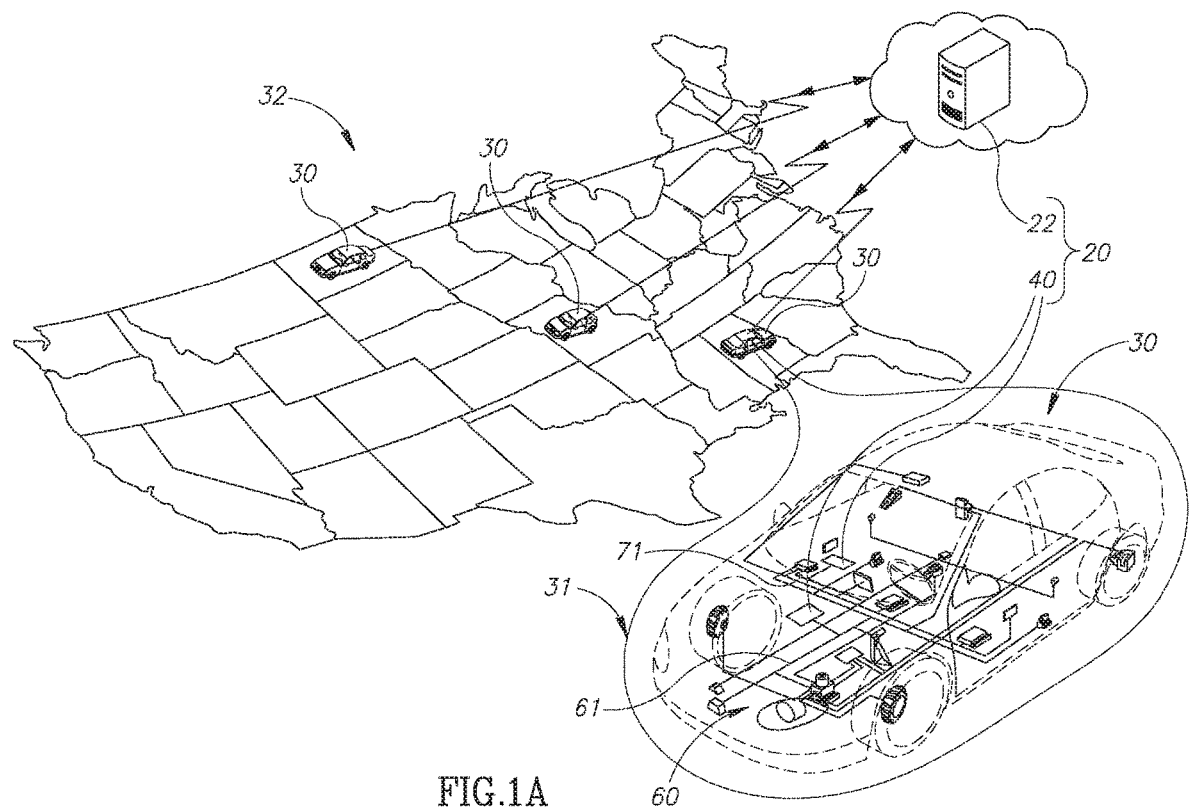
FIG. 1A schematically shows a GASS system for providing cyber security to a plurality of vehicles subscribed to GASS, in accordance with an embodiment of the disclosure.

FIG. 1A schematically shows a GASS 20 that provides cyber security services to vehicles 30 operating in an extended geographical region 32 in accordance with an embodiment of the disclosure. The extended geographical region may, comprise a region of a country such as a region covered by an infrastructure facility such as a power grid, a mobile communication network or a plurality of such networks, a metropolis, a state, and/or a region in which a given fleet of vehicles operates. Optionally, the extended geographical region is global, extending over portions of a continent or continents comprising more than one state. In FIG. 1A GASS 20 is shown by way of example operating to provide cyber security to in-vehicle communication networks of vehicles 30 in the continental US.

GASS 20 optionally comprises a cloud based CyberHub 22 and Watchmen 40 installed in subscriber vehicles 30 to monitor and protect their respective in-vehicle communication networks. An enlarged image of a subscriber vehicle 30 comprising an in-vehicle network 60 to which a plurality of optionally two GASS Watchmen 40 are connected in accordance with an embodiment of the disclosure is schematically shown in an inset 31. Watchmen 40, monitor communications traffic over portions of network 60 to which they are connected and perform procedures and undertake actions to provide and maintain integrity of the network against cyber attacks. In-vehicle communication network 60 is optionally a CAN network comprising a high-speed CAN bus 61 and a medium-speed CAN bus 71 to which various components of vehicle 30 are connected as nodes. A Watchman 40, in accordance with an embodiment of the disclosure, is connected to high-speed CAN bus 61 and to medium-speed CAN bus 71. Data is transmitted between nodes connected to buses 61 and 71 in CAN frames, which may be referred to as CAN packets, or CAN messages.

Figure 1B:
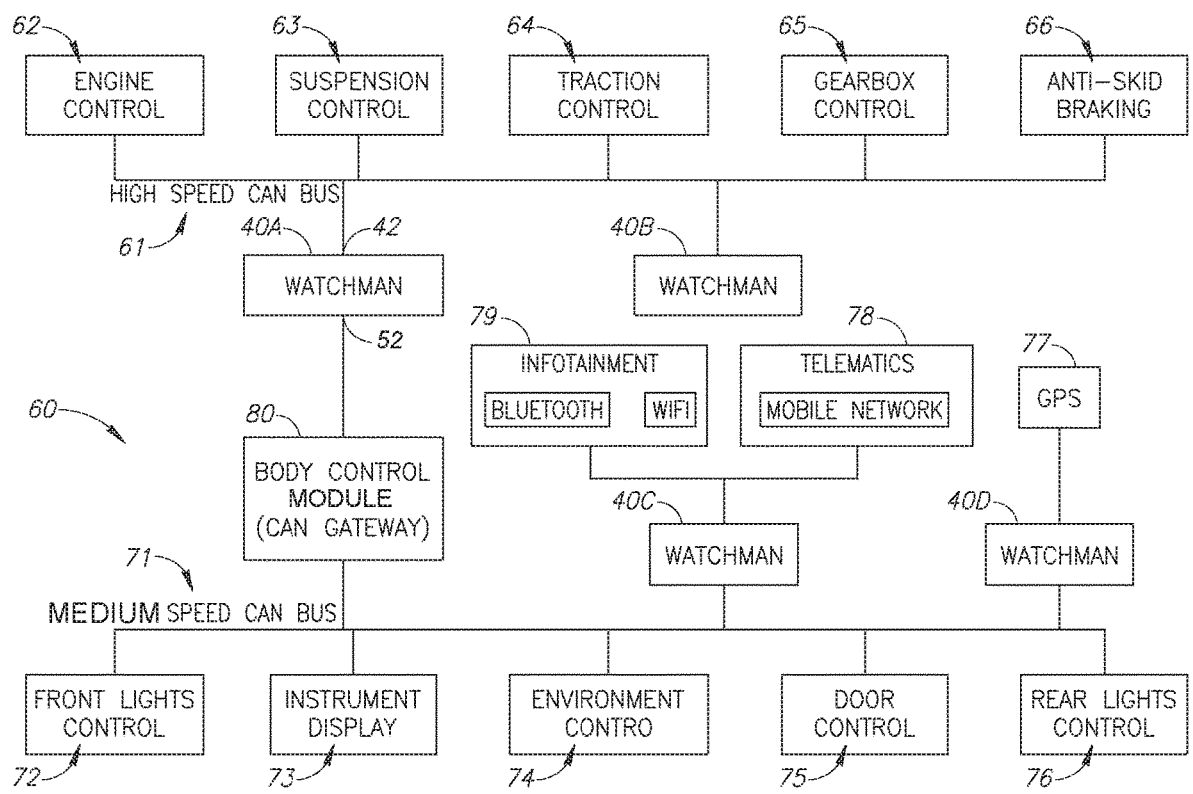
FIG. 1B shows a schematic block diagram of a portion of an in-vehicle communication system of a subscriber vehicle protected by GASS Watchmen, in accordance with an embodiment of the disclosure.

FIG. 1B shows a schematic block diagram of a portion of in-vehicle communication network 60 showing Watchmen 40 that protect the network and specific control systems as may be comprised in a subscriber vehicle 30. The control systems and/or their respective components are connected to high-speed and medium-speed bus bars 61 and 71. medium-speed CAN bus 71 may be a class B CAN bus that operates at data transmission speeds of up to 125 kilobits per second (Kbps), to support communications between nodes, such as components of vehicle body control systems and infotainment systems that can function properly receiving and transmitting data at relatively low data transmission rates. By way of example, medium-speed CAN bus 71 is schematically shown connected to nodes that are headlight, instrument display, environment control, door control, and rear light systems 72, 73, 74, 75, and 76 respectively. An infotainment system 79 comprising Bluetooth and Wifi communication interfaces and a Telematics system 78 that provides a communication interface to mobile phone networks and supports hands free calling are connected to medium-speed CAN bus 71 via a Watchman discussed below. A GPS receiver 77 is optionally separate from Telematics system 78, and is connected to medium-speed CAN bus 71. High-speed CAN bus 61 may be a class C CAN bus that operates at data transmission speeds of up to 1 megabits per second to support communications between nodes such as sensors and ECUs of various control systems that may require relatively high-speed transmission of data between the nodes to operate properly. High-speed CAN bus 61 is schematically shown connected to engine, suspension, traction, gearbox, and braking control systems 62, 63, 64, 65, and 66 respectively. High-speed CAN bus 61 is connected by a body control system gateway 80 to medium-speed CAN bus 71.

In-vehicle network 60 is protected by a configuration of a plurality of, optionally four, Watchmen 40, individualized by labels 40A, 40B, 40C, and 40D. Watchmen connected to network 60 are referenced generically by the numerical reference 40 and by the individualized labels 40A, 40B, 40C and 40D with respect to features associated with a particular Watchman. Watchman 40A is optionally a two communication port module connected between high-speed bus 61 and gateway 80 that connects the high-speed bus to medium-speed bus 71. Watchman 40B is optionally a single communication port module connected to high-speed bus 61. Infotainment system 79 and Telematics system 78 are connected via Watchman 40C, to medium-speed bus 71 and GPS receiver 77 is optionally connected via Watchman 40D to medium-speed bus 71. Watchman 40A operates in accordance with an embodiment of the disclosure to monitor CAN messages that are transmitted between high-speed bus 61 and gateway 80 and to respond to anomalous communications to protect communications between the CAN bus and the gateway. Watchman 40B is connected to high-speed CAN bus 61 to eavesdrop on communications over the high-speed bus and protect communications propagated over the bus. Watchman 40C and 40D operate to protect medium-speed CAN bus 71 from Cyber attacks that attempt to enter in-vehicle communication system 60 via its Bluetooth, WiFi, and mobile telephone communication interfaces. Watchmen in accordance with an embodiment of the disclosure are not limited to a number of communication ports shown in FIG. 1A and may have a number of communication ports different from the numbers shown in FIG. 1A.

Whereas in FIGS. 1A and 1B Watchmen 40 are schematically shown as separate components that appear to be hardware components, a Watchman in accordance with an embodiment of the disclosure may be a "virtualized Watchman" defined by a software component comprised in a node of in-vehicle communication network 60. For example, gateway 80 may comprise computer executable instructions and data, or a combination of software and hardware that provide Watchman functionalities in accordance with an embodiment of the disclosure that may be provided by Watchman 40A, shown separate from the gateway in FIG. 1B. Or an ECM (not shown) in engine control system 62 may comprise computer executable instructions and data that provide Watchman functionalities in accordance with an embodiment of the disclosure that may be provided by Watchman 40A, or Watchman 40B. A Watchman may also be integrated to the hardware of a node, such as telematics unit 78, of in-vehicle communication network 60, between the CAN transceiver and the CAN controller of the node.

A Watchman 40, such as Watchman 40A, 40B, 40C, or 40D in accordance with an embodiment of the disclosure, may operate in a mode or modes selectable from a library of operating modes. Each operating mode in the library may evoke an optionally different operating algorithm or procedure that the Watchman may execute to process and/or to respond to messages transmitted over a portion of in-vehicle network 60 that the Watchman monitors. The library of operating modes comprises at least one of, or any combination of more than one of: a passive mode, a recording mode, a communication mode, a standard protection mode (SPM), a detective mode, a programming mode, and/or an override mode.

A Watchman 40 may be set to a given operating mode by manually operating a dip switch that the Watchman may have, and/or by transmitting a control message to the Watchman via a wire or wireless communication channel that instructs the Watchman to assume a particular operating mode. A Watchman 40 may autonomously switch between different operating modes when an instruction that the Watchman executes during operation in a first operating mode switches the Watchman to a second operating mode to execute an instruction in the second operating mode. Different operating modes may also provide or share same or similar functionalities and a Watchman may simultaneously be operating in more than one operating mode.

In the passive mode a Watchman 40 does not interfere with the propagation of messages in in-vehicle network 60 that the Watchman may receive, and the Watchmen may substantially be transparent to communications over the in-vehicle network. Watchmen 40 may by way of example advantageously be set to the passive mode for example, during installation of new components and/or sensors to vehicle 30 and connection of the components and/or sensors as nodes to in-vehicle communication network 60. The Watchmen may also advantageously be set to passive for example when connecting a diagnostic console (not shown) to an On Board Diagnostics (OBD) port (not shown) in vehicle 30 to connect the diagnostic console to in-vehicle communication network 60 and query the vehicle's self diagnostic and reporting functionalities for information regarding systems connected to the network. A Watchman may also be configured to automatically set itself to a passive mode when it encounters a critical internal error, as a failsafe mechanism.

Setting Watchmen 40 in vehicle 30 to the passive mode suspends protective activity by the Watchmen. Attempting to set Watchmen 40 to passive by transmitting control messages to the Watchmen, may therefore, in accordance with an embodiment of the disclosure, be allowed only after the control messages have been authenticated as originating from an authorized source and vetted for form and for being appropriate for a state of vehicle 30 and its in-vehicle communication network 60 at a time when the control messages are received. For example, an attempt to set Watchmen 40 to passive may be denied if vehicle 30 is in motion, or if the attempt originates from a source other than GASS 20, an authorized user of GASS or a driver of the vehicle. Authenticating and vetting messages received by Watchmen 40 are discussed below.

In the recording mode, a Watchman 40 monitors communications in in-vehicle communication network 60 of subscriber vehicle 30 to accumulate data from messages that it receives which may be used to characterize the messages, determine a vehicle context of the messages, and/or determine a measure of health of the vehicle. CAN messages may be characterized for example, by their 11 bit, or 29 bit extended, arbitration ID, which of the generally four types of conventional CAN messages they are, their respective frequency of transmission, an amount and type and contents of data they include, a time stamp recording a time at which they are transmitted, and a vehicle context at a time of the time stamp. A CAN message arbitration ID may hereinafter be referred to as a CAN message ID or message ID.

Vehicle context for a subscriber vehicle 30 refers to a state of the vehicle and/or a state of the vehicle's in-vehicle communication network 60. State of vehicle 30 may be defined responsive to a value for each of at least one parameter, which one or more than one sensor in the vehicle provides for example in a data portion of a CAN message that it transmits. The at least one parameter may for example, comprise one, or any combination of more than one of, vehicle speed, acceleration, closing speed to a leading or trailing vehicle, engine rpm, engine temperature, oil pressure, hydraulic pressure, wheel traction, road condition, vehicle location optionally provided by a GPS signal, and/or weather condition. State of in-vehicle network 60, may by way of example, be defined responsive to baud rate, which types of messages are being transmitted over the network, and/or which nodes in in-vehicle communication network 60 are actively communicating over the network. State of in-vehicle communication network may also comprise a state or contents of a communication session of which the CAN message is a part. State of in-vehicle network 60 may be defined responsive to a value for a derived parameter, hereinafter also referred to as a cyber-state indicator (CSI), which indicates whether or not, and/or to what degree, in-vehicle network 60 may be compromised by a cyber attack. CSI may be determined by Watchman 40 responsive to messages transmitted over the in-vehicle network that the Watchman monitors and/or by Cyber-Hub 22 responsive to data that the Cyber-Hub receives from the Watchman and/or from a Watchman 40 or Watchmen 40 monitoring other in-vehicle networks.

A Watchman 40 may generate and store in a memory comprised in the Watchman a context feature vector that defines and represents the vehicle context. The context feature vector may comprise components that include a time stamp, values of the at least one parameter provided by the one or more sensors in the vehicle, and/or values for parameters describing the state of in-vehicle network 60. The context feature vector may also include ID data for vehicle 30 such as make and year of the vehicle, an Odometer reading and optionally a CSI value at a time of the feature vector time stamp. A context feature vector in accordance with an embodiment of the disclosure may comprise values of a histogram. For example, a context feature vector may comprise components that are values of a histogram, also referred to as a message frequency histogram, that provides a frequency or relative frequency of transmission over in-vehicle network 60 for each of a plurality of different CAN message IDs, or different subsets or types of CAN messages. Optionally, the context feature vector may comprise several different histograms, one for each subset of messages. A message subset may comprise messages transmitted to or from a selection of different nodes connected to in-vehicle network 60. The selected nodes may for example comprise engine, suspension, gearbox, and door control systems 62, 63, 65, and 75. A message subset make comprise messages having particular instructions or portions thereof, such as instructions for increasing engine air or fuel intake, or generating proximity alarms responsive to signals from proximity sensors. Optionally, in order to protect the Watchman against an attack that may try to cause the Watchman to use up all its available memory by sending a sequence of CAN messages with different message IDs, the memory used by the histogram may be limited and pre-allocated. Optionally, if the Watchman runs out of available memory for the histogram, it may free up memory by discarding old histogram data.

A measure of health of a vehicle 30 may be characterized or determined responsive to data in CAN messages transmitted over in-vehicle network 60 by sensors, actuators, and/or ECUs in the vehicle under different operating conditions of the vehicle that Watchmen 40 receive. For example, engine temperature and fuel consumption as a function of speed, or oxygen content in engine exhaust as a function of engine speed provided in massages transmitted by components of an vehicle engine control system of vehicle 30 may be used to provide a measure of health of the engine. Messages provided by a vibration monitor that provide data representing frequency or amplitude of vibration of a body component as a function of vehicle speed may be used to determine a measure of vehicle health.

Watchman 40 may generate and store in a Watchman memory a health feature vector for vehicle 30 that provides a measure of the vehicle's health responsive to messages that the Watchman monitors. Similar to the vehicle context feature vector, the vehicle health feature vector may include vehicle ID data and a CSI value.

Data acquired by a Watchman 40 when operating in the recording mode, such as data characterizing CAN messages propagated over in-vehicle communication network 60, data comprised in vehicle context and health feature vectors, may advantageously be processed for use by the Watchman when operating in operating modes other than in the recording mode. For example, as described below, Watchman data acquired by the Watchman may be used by the Watchman in determining how to respond to messages it receives when operating in the SPM mode or, in the programming mode, to configure the Watchman for operation in, for example, the SPM mode. And data associated by the Watchman with a CSI value indicating that the data was acquired free of Cyber damage contamination may be processed to characterize and/or establish criteria for normative communications between nodes of in-vehicle communication network 60.

For example, data comprising message IDs and features characterizing CAN messages propagated over in-vehicle communication network 60 that are associated with a CSI value indicating that are free of cyber damage may be used to provide a "white list" of CAN messages. In an embodiment, the white list comprises message IDs of CAN messages propagated during a period or periods during which in-vehicle communication network 60 was free of damage from cyber attack and optionally "cyber clean" data characterizing their respective propagation during the period or periods. The cyber clean data for a given white listed CAN message ID may comprise data characterizing relative frequency of transmission of the given CAN message and optionally message contexts of the message that reference other CAN messages with which transmission of the given CAN message is associated. Optionally, cyber clean data for the given white listed CAN message is provided as a function of vehicle context.

A "white list" of messages, optionally with their corresponding features and contexts may also be created by referencing vehicle manufacturer CAN specifications which define CAN messages that the manufacturer's vehicles use to control the vehicles, vehicle accessories and/or add-ons. Optionally, a vehicle manufacturer's catalogue of CAN messages is automatically translated to provide a white list of CAN messages in a format useable by Watchman. A graphical user interface (GUI) of an in-vehicle network used in the manufacturer's vehicles, and amounts and types of communication traffic anticipated between nodes in the network may be used to aid a person to manually translate a manufacture CAN catalogue of CAN messages to a white list in Watchman format.

In an embodiment, a Watchman 40 receiving a white listed CAN message does not interfere with its normal propagation over in-vehicle network 60. Optionally, non-interference is predicated upon the white listed CAN message being received in association with the "white list" contexts that that may be referenced for the CAN message in the white list.

Similarly, CAN messages that are determined responsive to data acquired during a recording mode of Watchman 40 to be malware, to be associated with malware, and/or to be compromised by a cyber attack, and their respective characterizing features and contexts may be listed in a "black list". In an embodiment, a black-listed CAN message received by Watchman 40, optionally in association with its corresponding black listed features and contexts, may be blocked by the Watchman from further propagation over in-vehicle network 60. CAN messages and their respective features and contexts may also be manually classified and added to a "black list" by cyber security analysts, optionally using a suitable GUI of known recorded cyber attacks.

It is noted that whereas acquisition of data with respect to communications over in-vehicle communication network 60 has been discussed for Watchman 40 operating in the recording mode, Watchman 60 may acquire and store data relevant to communications over in-vehicle network 60 during other operating modes of the Watchman. For example, data acquired by Watchman 40 when operating in the SPM, protective, mode during which the Watchman regularly vets CAN messages to determine if they should be allowed to propagate over in-vehicle network 60 may be used to white list or black list CAN messages. CAN messages that Watchman 40 encounters during operation in the SPM mode or the recording mode that have not been classified, and/or may not readily classified as white list or black list, possibly because for example, they have not been encountered before or are infrequently encountered, may be gray listed. Watchman 40 may allow gray listed CAN messages only limited access to in-vehicle communication system 60. For example, Watchman 40 may limit a frequency of transmission over the in-vehicle network. Can messages may be gray listed by Watchman 40 during any of its operating modes.

It is further noted that Watchman 40, in accordance with an embodiment of the disclosure may in addition to recording data relevant to CAN messages, vehicle context, and/or health, during operation in the recording mode or another operating mode, may also keep a log of data relevant to its own performance and operation for analysis. For example, Watchman performance data may be used to determine how frequently the Watchman generated false positives or false negatives in identifying messages as malware. And, Watchman performance data may be used to determine how frequently the Watchman has received remote commands or updates with non-valid digital signatures that may be an indication for a cyber-attack.

Processing data provided by a Watchman 40 may be performed by the Watchman, or by Cyber-Hub 22 or an authorized user of GASS 20 subsequent to the Watchman conveying the data to the Cyber-Hub or authorized GASS user. Watchman 40 may convey data to an entity in accordance with execution of an instruction of the recording mode or during operation in the communication mode. Cyber-Hub 22 may aggregate data from a plurality of different Watchmen in a fleet to create high level conclusions regarding cyber and operational health of the fleet. Cyber-Hub 22 may also aggregate data between different fleets. The Cyber-Hub may provide a user interface that displays high level information regarding the cyber health of the fleet and raw data that may be used by cyber analysts to understand the high level information. For example the user interface may display a number of anomalies and/or blocked cyber attacks and/or vehicle malfunctions detected in a specified timeframe and/or geographical area in a format of a heat map. Optionally, the Cyber-Hub may keep track of which Watchmen have not communicated with it for more than a specified period of time and other cyber and operational related measurements and may provide this information to its users via a suitable user interface. The Cyber-Hub may optionally issue live alerts to subscribers to GASS 20 regarding critical events.

In the communication mode Watchman 40 may convey data that it has acquired and/or processed to Cyber-Hub 22 and/or to a diagnostic console (not shown) via suitable wire and/or wireless communication channels. Watchman 40 may be configured or controlled to periodically switch to the communication mode and upload data or a portion of data, such as a message frequency histogram, it acquires during operation in the recording mode or in another operating mode, to Cyber-Hub 22. Watchman 40 may be accessed to switch to the operating mode and requested to convey data that it acquires to a diagnostic console connected to an OBD port in vehicle 30, or to a mobile communication device such as a smartphone, laptop, or tablet, via a wireless channel. In an embodiment, Watchman 40 may switch to the communication mode and provide the requested data optionally encrypted and only after authenticating that the request is made by an entity authorized so receive the data. In an embodiment, Watchman 40 may autonomously switch to the communication mode for example to request information from or to transmit information to Cyber-Hub 22. Information that the Watchman may request may be information regarding updates to the Watchman set of rules and/or instructions for responding to CAN messages during Watchman operation in the SPM mode.

In order to efficiently utilize available bandwidth, a Watchman 40 may optionally send the information it has acquired to Cyber-Hub 22 only after Cyber-Hub 22 has given it permission to upload the information, based on a short description of the information provided the Cyber-Hub by the Watchman. For example if an entire fleet of vehicles is under a cyber-attack at the same time and all the Watchmen in the fleet attempt to report the cyber-attack to Cyber-Hub 22, the Cyber-Hub 22 may choose to prevent saturation of bandwidth by receiving relevant data from a relatively small number of the vehicles under attack. Optionally, additional savings in bandwidth may be applied by compressing the data sent to Cyber-Hub 22. For example message frequency histograms that a vehicle 30 acquires may be stored in a relatively compact form, using 1 byte for a number of occurrences for each message ID. In order to avoid overflow, the value of the count per message ID may periodically be divided by for example 2, thus making the histogram a local frequency histogram. Optionally, the histogram may keep its extreme values by not allowing the division to change the MSB (most significant bit) and LSB (least significant bit) bits in the count, should they be 1.

It is noted that an in-vehicle communication network, such as in-vehicle network 60 schematically shown in FIGS. 1A and 1B, may be connected to a plurality of Watchman 40, each optionally monitoring a different portion of the network. Optionally, an in-vehicle communication network connected to a plurality of Watchman 40, may have a Watchman 40, a "Super-Watchman" that operates as a communication hub or router for the other Watchmen. The Super-Watchman may for example, aggregate data acquired by other Watchman connected to the network to convey the data to Cyber-Hub 22 or an authorized user of GASS 20. The Super-Watchman may also operate to receive communications from the Cyber-Hub or authorized entities outside of the in-vehicle communication network intended for other Watchmen connected to the in-vehicle communication network and route the communications to the intended Watchmen. In an embodiment, a plurality of Watchmen connected to a same in-vehicle communication network may communicate via buses in the network or be configured as a wireless local network to communicate with each other.

In the SPM mode, Watchman 40 invokes an operating algorithm that comprises a menu of response actions that may be undertaken by the Watchman in response to messages propagated over in-vehicle network 60, and a set of rules, hereinafter also referred to as matching rules, that the Watchman uses to match the messages with at least one response action in the menu. A matching rule is an instruction for inspecting at least a portion of a message, to determine a feature of the message that may be used as, or in establishing, a criterion for determining which response action should be matched to the message and undertaken by Watchman 40 in response to receiving the message. A specific set of matching rules may be defined in a configuration of the Watchman and may be represented in memory as a variant of a decision tree data structure in which nodes may represent a specific condition and/or action. The configuration may determine a layout, type and specific parameters of the rules along with appropriate actions for routes in the tree.

Response actions in the menu that may be undertaken in response to a given message that Watchman 40 receives, may by way of example comprise: allowing the message, blocking the message, delaying the message; limiting the frequency of the message, logging the message into a memory comprised in the Watchman; changing a state feature vector representing a state of the vehicle; and/or raising an alert responsive to the message.

Matching rules for determining response to a CAN message may, by way of example, comprise: inspect the arbitration portion of the message to determine a message ID; determine if the message is one of the four conventional CAN message types and which type it is; determine a source port in the Watchman of the message; determine if data content in the message is data that is valid for features that characterize the vehicle, such as by way of example, make, model, and mechanical condition of the vehicle; determine a transmission frequency for the message; determine a vehicle context for the message. The rules may use complex logic that incorporates several sub conditions using logic operators such as AND, OR, NOT and masking methods to inspect only parts of the data of a CAN message. For example, a Watchman 40 may enforce a minimum period of time that must pass between seeing a message having a particular message ID and allowing the message to appear again on possibly another port of the Watchman, to prevent a cyber attacker from listening to communication traffic on the bus, waiting for a given legitimate message to be sent on the bus and soon thereafter send another similar ID'd message with malicious content, in order to override the given legitimate message.

Figure 2A:
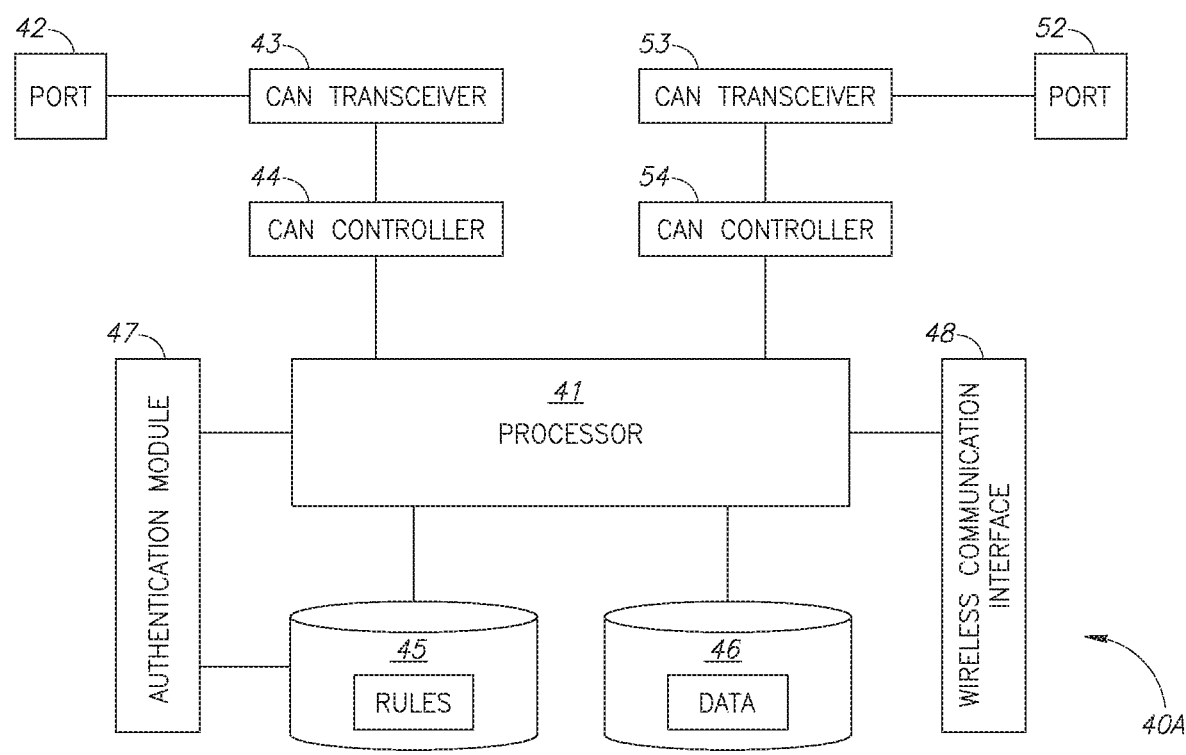
FIG. 2A shows a schematic block diagram of a Watchman, in accordance with an embodiment of the disclosure.

FIG. 2A schematically shows components of a Watchman 40, for example Watchman 40A connected to in-vehicle communication network 60 that support operation of the Watchman in the SPM and other operating modes of the Watchman, in accordance with an embodiment of the disclosure.

Watchman 40A optionally comprises a processor 41 and optionally two communication ports 42 and 52 for transmitting messages to and receiving messages from a CAN bus or a CAN node to which the Watchman is connected. For example, in FIG. 1B communication port 42 of Watchman 40A is connected to high-speed bus 61 and port 52 of the Watchman is connected to CAN gateway 80. Port 42 is connected to processor 41 by a CAN transceiver 43 and a CAN controller 44. Transceiver 43 converts bits in a CAN message, which are serially received from high-speed bus 61 at port 42, from a CAN format to a format used by Watchman 40A and forwards the bits to CAN controller 44. The CAN controller stores the bits until all the bits in the CAN message to which the bits belong are received, and the complete message is assembled. CAN controller 44 forwards the assembled message to processor 41 for processing in accordance with an embodiment of the disclosure. CAN controller 44 also receives bits generated by processor 41 for transmission from Watchman 40A to high-speed CAN bus 61 in a CAN message, and forwards the bits to transceiver 43 for conversion from a Watchman format in which the bits are generated to a CAN format. Transceiver 43 forwards the bits in the CAN format for transmission to CAN bus 61 via port 42. Similarly to port 42, port 52 is connected to processor 41 by a transceiver 53 and controller 54 and operates for transmitting CAN messages to and from CAN gateway 80.

Processor 41 processes a message it receives via port 42 or port 52 in accordance with computer executable instructions for executing matching rules, white and black lists of CAN messages, and response actions, optionally stored in a memory 45, and optionally in accordance with a vehicle context during which the message is received. The vehicle context may be determined by Watchman 40A responsive to data comprised in messages that Watchman 4A receives and optionally uses to define a context feature vector, which the Watchman stores as data in a memory 46. Memory 45 and/or memory 46 may include primary and/or secondary memory used by Watchman 40 and whereas memories 45 and 46 are schematically shown as separate units the memories may be comprised in a same unit.

Watchman 40A optionally comprises an authentication module 47 for authenticating messages the Watchman receives and a wireless communication interface 48 for communicating with Cyber-Hub 22, authorized users, drivers of subscriber vehicles, and other external entities via a wireless communication channel. Wireless interface 48 may provide connectivity to a WiFi, and/or a Bluetooth channel and/or a mobile phone network such as a 3G network. In the absence of such a wireless capability, a Watchman in accordance with an embodiment of the disclosure may communicate with Cyber-Hub 22 over an existing vehicle connection to the cloud. This may be performed by tunneling via a CAN bus, such as CAN bus 71 or 61 to an ECU in the in-vehicle network 60 that may have connectivity to the cloud. The tunnel may be implemented by reading and writing PIDs according to the Unified Diagnostic System Standard or by using any other protocol supported by the CAN bus.

Authentication module 47 may comprise computer executable instructions for authenticating a message that Watchman receives using any of various authentication algorithms. Authentication algorithms that may be used by authentication module 47 may comprise for example, any of various asymmetric key encryption algorithms, a combination of asymmetric and symmetric key encryption algorithms, and may include authentication algorithms such as TLS (Transport Layer security), and PGP (Pretty Good Privacy). Optionally authentication module 47 is or comprises a hardware security module (HSM) for authenticating received messages. In an embodiment, authentication may be implemented so that it will not be susceptible to a "Reply Attack", for example by including a timestamp in authenticated data. In cases where no secure timestamp information exists in Watchman 40A, the Watchman may initialize a clock it comprises randomly and securely send a "pseudo timestamp" to Cyber-Hub 22 which in turn may use the pseudo timestamp in further communications with the Cyber-Hub.

Figure 2B:
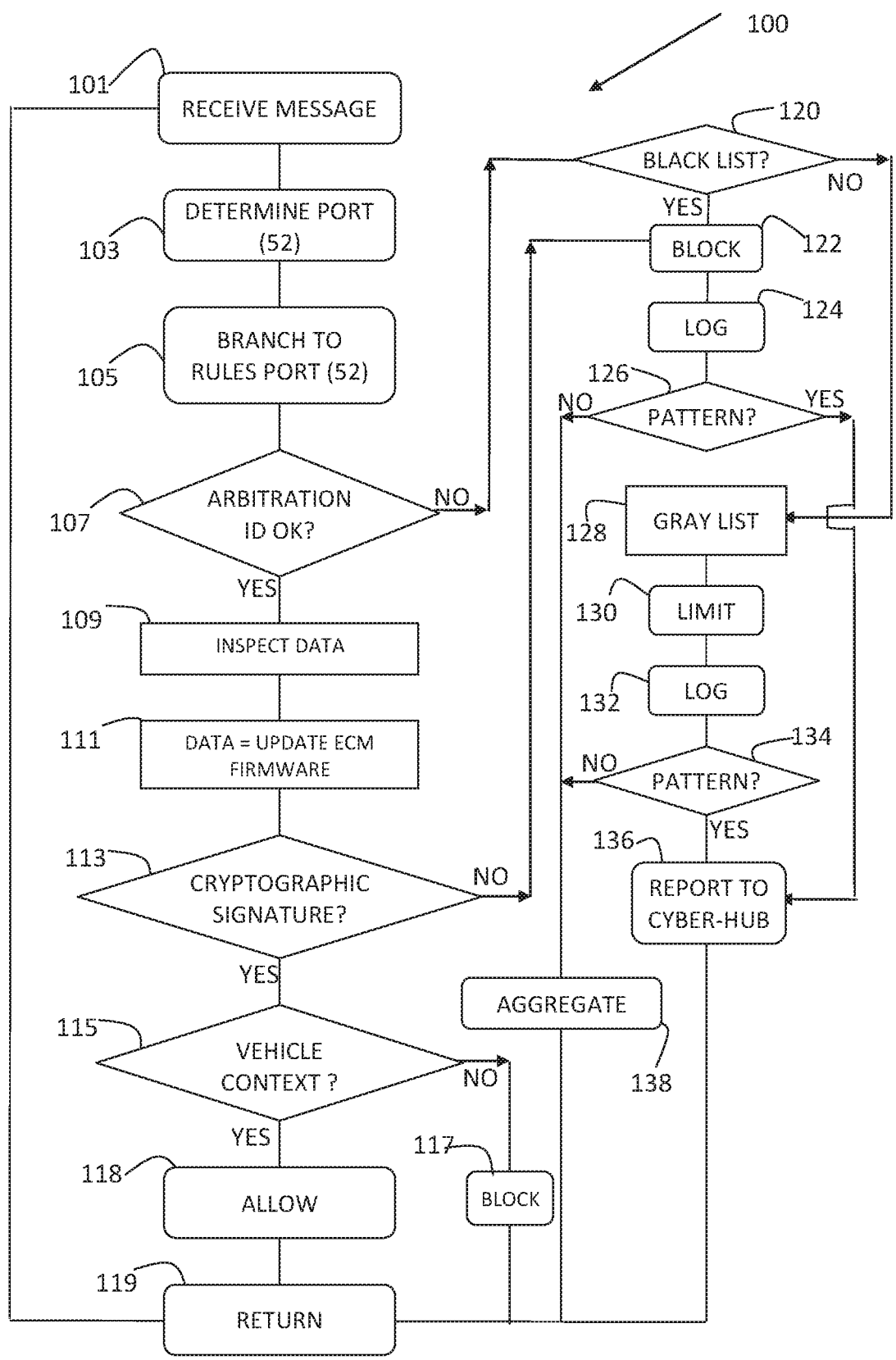
FIG. 2B shows a flow diagram of an algorithm that the Watchman shown in FIG. 2A executes in response to a message that the Watchman receives from the in-vehicle network to which the Watchman is connected, in accordance with an embodiment of the disclosure.

FIG. 2B shows a flow diagram 100 of an example scenario of a response by Watchman 40A to a CAN message propagated over in-vehicle communication network 60 that the Watchman receives during operation in the SPM mode, in accordance with an embodiment of the disclosure.

In a block 101 Watchman 40A receives a CAN message and optionally in a block 103 determines that the message was a message transmitted by gateway 80 and received by processor 41 via port 52 (FIG. 1B). In a block 105 processor 41 (FIG. 2A) accesses memory 45 to process the received message responsive to rules in the memory and white and black, CAN message lists that are relevant to messages received via port 45. In a decision block 107 the processor vets the 11 or 29 CAN message ID bits of the message to determine if the message ID is valid and may be allowed ingress to high-speed bus 61.

If processor 41 determines in decision block 107 that the message ID is not a message ID of a white list CAN message, the processor proceeds to a block 120 and determines whether or not the ID is a black list message ID. If the message is a black list message, the processor optionally proceeds to a block 122 and blocks the message from entry to high-speed CAN bus 61. Optionally, in a block 124, processor 41 logs data relevant to the message into memory 46 for possible future uploading to Cyber-Hub 22, reference, and/or analysis by the Watchman and/or the Cyber-Hub. In a block 126 processor 41 makes a determination as to whether the message appears to be part of a pattern of messages, for example a pattern of repeated identical messages or a pattern of unwarranted message, that indicate a cyber attack.

If processor 41 determines that the message does not indicate a cyber attack, processor 41 proceeds to a block 138 to aggregate the message ID by logging the ID to a frequency histogram and/or to store the whole message for future uploading to Cyber-Hub 22. On the other hand if processor 41 determines that the message indicates a cyber attack, the processor proceeds to a block 136 and controls Watchman 40A to report reception of the message to Cyber-Hub 22 and thereafter proceed to block 119 and return to block 101 to receive and process a next CAN message If in decision block 120, processor 41 determines that the message received at port 52 is not a black list message, the processor optionally proceeds to a block 128 and determines that the message is, or may be classified as, a gray list message. In a block 130, the processor may determine to limit a number of messages having the same message ID as that of the received message from being forwarded to high-speed bus 61 or to limit a frequency with which the messages are forwarded to the high-speed bus. Optionally, in a block 132 processor 41 logs data relevant to the message into memory 46 for possible future uploading to Cyber-Hub 22, reference, and/or analysis by the Watchman and/or the Cyber-Hub. And in a decision block 134 processor 41 determines if the message indicates or does not indicate a cyber attack. If it appears to indicate a cyber attack, the processor optionally proceeds to block 136 to report reception of the message to Cyber-Hub 22 and proceed thereafter to block 119 and return to block 101 to receive another CAN message.

If in decision block 134 processor 41 determines that the message received at port 52, which is classified as a gray list, does not appear indicate a cyber threat, processor 41 optionally proceeds to block 138 to aggregate the message ID by logging the ID to a frequency histogram and/or to store the whole message for future uploading to Cyber-Hub 22. The processor then optionally proceeds to a block 119 to return to block 101 and receive another CAN message.

If in block 107 processor 41 determines that the message received by Watchman 40A at port 52 is a white list message the processor optionally proceeds to a block 109 and initiates inspection of data comprised in the data portion of the message.

By way of an exemplary scenario, it is assumed that in a block 111 the processor determines that the data section comprises an instruction for updating firmware in optionally the ECM (not shown) of engine control system 62. Presumably, the message and instruction it comprises entered in-vehicle network 60 via a communication interface, such as the mobile network interface, comprised in telematics system 78 (FIG. 1B), that connects the in-vehicle communication network to communication networks outside of vehicle 30. Prior to allowing the message to proceed to high-speed bus 61 and engine control system 62, processor 41 determines in a block 113 if the message has been authenticated by authentication module 47 in Watchman 40A, or in Watchman 40C, as properly cryptographically signed. If the message is improperly signed, or not signed, processor 41 blocks the message in block 122, optionally in block 124 logs the event of receiving the message and data relevant to the reception in memory 46, and proceeds to decision block 126. If in block 126 the processor determines that the message, even though unsigned or improperly signed does not indicate a cyber threat, the processor controls Watchman 40A to return to block 101 to receive a next message. And if processor 41 determines that the message is a threat, it proceeds to carry out the actions in blocks 136 to 140 discussed above.

If the processor determines in block 113 that the message is properly cryptographically signed, in a block 115 the processor accesses vehicle context data that may be relevant to and may constrain execution of the firmware update instruction comprised in the message. By way of example, execution of the updating instruction in the message may be constrained by a requirement that vehicle 30 be moving at a speed less than ten kilometers per hour (kmp) and processor 30 may access context data comprising the speed of vehicle 30. In an embodiment, the context data is accessed from memory 46 or extracted in real time from a CAN message at a time substantially the same as a time at which the message being vetted was received by Watchman 40A via port 52. If the context data indicates that vehicle 30 is moving at a speed greater than 10 kmp, processor 41 proceeds to a block 117 and blocks the message from propagating to high-speed bus 61 and engine control system 62. The processor optionally proceeds thereafter to a block 119 and block 101 to receive a next message. If on the other hand the vehicle context data indicates that the speed of vehicle 30 is less than 10 kmp, processor 41 optionally proceeds to block 118, allows the message received at port 52 to propagate to high-speed bus 61 and to engine control system 62 and execute the firmware updating instruction.

In the description of the exemplary scenario above, Watchman 40A protects high-speed bus 61 by preventing "cyber malice" messages from propagating from medium-speed bus 71 to high speed bus 61 by not allowing the messages to pass through the Watchman. In an embodiment of the disclosure a Watchman may be connected to a portion of an in-vehicle network that it protects so that it eavesdrops on the portion, and messages, optionally, do not pass through the Watchmen to propagate to or on the portion.

For example, Watchman 40B, shown in FIG. 1B is connected to high-speed bus 61 so that it can monitor traffic on high-speed bus 61 but not so that it can block cyber malware messages from propagating on the bus by preventing them from passing through the Watchman. An eavesdropping Watchman, such as "bus Watchman" 40B, blocks potentially damaging messages propagating on portion of an in-vehicle network that it monitors, in accordance with an embodiment of the disclosure, by "poisoning" the messages to corrupt them to an extent that they are not accepted or used by nodes connected to the network.

Figure 2C:
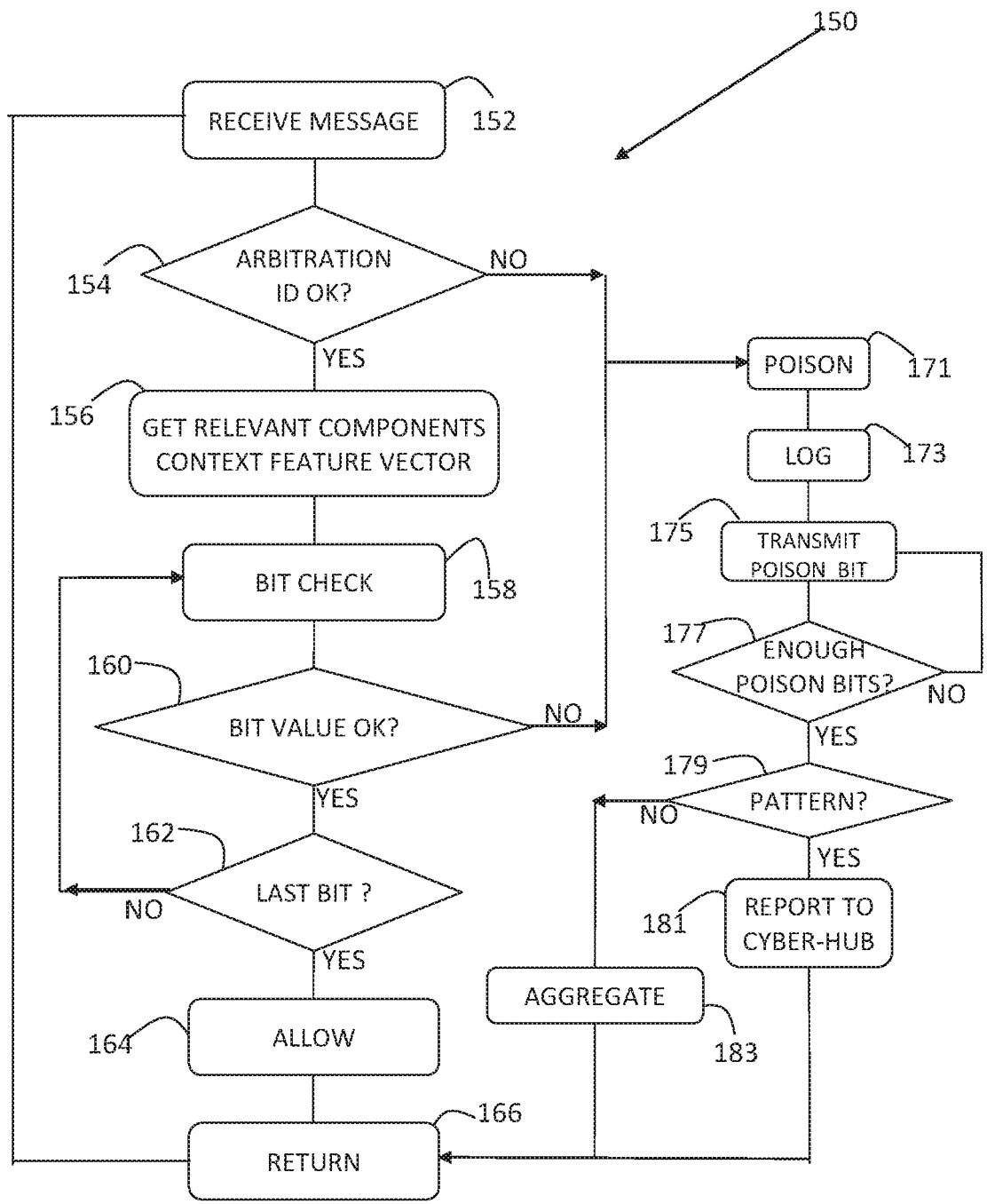
FIG. 2C shows a flow diagram of an algorithm that a Watchman executes to protect a bus of the in-vehicle communication network shown in FIG. 1B, in accordance with an embodiment of the disclosure.

FIG. 2C shows a flow diagram 150 of an example scenario of a response by Watchman 40B to a potentially damaging CAN message propagating over high-speed bus 61 in-vehicle communication network 60, to which the Watchmen is connected in accordance with an embodiment of the disclosure. Except for having, optionally, only one communication port, Watchman 40B is assumed to have internal components similar to those shown in FIG. 2A for Watchman 4A.

In a block 152, Watchman 40B receives bits of a CAN message propagating on high-speed bus 61. In a decision block 154 processor 41 of the Watchman vets the ID of the message to determine if it is an ID of a potentially damaging message, which advantageously should not be allowed to propagate on high-speed bus 61. For example, the ID may be the ID of a black listed message, an ID of a message that is not appropriately signed, or an ID that is not known in the lexicon of acceptable IDs of CAN messages used by in-vehicle communication network 60. If Watchman 40B determines that the message should be blocked, it proceeds to a block 171 to begin a process of poisoning and corrupting the message so that it is unacceptable to nodes connected to high-speed bus 61. In a block 173 Watchman 40B logs the message ID and data relevant to the message into memory 46 for possible future uploading to Cyber-Hub 22, reference, and/or analysis by the Watchman and/or the Cyber-Hub.

In a block 175, processor 41 causes Watchman 40B to transmit a bit onto high-speed bus 61 that is intended to replace and corrupt the message. The CAN protocol that configures message transmission over in-vehicle network 60 uses a dominant bit and a recessive bit to transmit CAN messages. The dominant bit is usually the "0" bit and the recessive bit is usually the "1" bit. If a dominant and a recessive bit are simultaneously transmitted on a same bus of a CAN network, such high-speed bus 61 in in-vehicle network 60, the dominant bit survives and is received by nodes connected to the bus and the recessive bit does not survive and is not received by the nodes. In block 175 therefore, processor 41 of Watchman 40B causes the Watchman to transmit a dominant bit, optionally referred to as a "poison bit", onto high-speed bus 61, and then optionally proceeds to a block 177 to determine if a sufficient number of dominant bits has been transmitted to corrupt and block the unwanted message propagating on high-speed bus 61. If in block 177 processor 41 determines that Watchman 40B has not transmitted enough poison bits, the processor returns to block 175 and causes the Watchman to transmit another dominant bit. Watchman 40B and its processor 41 cycle through blocks 175 to 177 until in block 177 the processor determines that a sufficient number of dominant, poison, bits have been transmitted to destroy the message.

In accordance with the CAN protocol, an uninterrupted sequence of six of the same bits generates an error in a CAN message and causes the message to be discarded by nodes receiving the message. Therefore, Watchman 40B may return from block 177 to block 175 at least five times to transmit at least six dominant bits on high-speed bus 61 to corrupt and destroy the message propagating on the bus, which processor 41 determined in block 154 should be blocked.

A CAN message typically comprises a 15 bit cyclic redundancy check (CRC) code at an end of the message following eight bytes of data in a data portion of the message. In an embodiment of the disclosure, to destroy and block a CAN message, processor 41 may operate to control Watchman 40B to transmit at least one dominant bit to replace at least one passive CRC bit of the message rather than to replace data bits of the message. For example, Watchman 40B may transmit a dominant 0 to replace a passive 1 in the CRC to destroy and block the CAN message. By replacing CRC bits rather than data bits, the data bits may be stored in memory 46 (FIG. 2A) for future analysis of the blocked message.

Following transmission of the at least six poison bits, processor 41 proceeds to execute actions in blocks 179-181 similar to actions discussed above with reference to FIG. 2B with respect to blocks 134 and 136 to determine if the message destroyed by transmission of poison bits is associated with a cyber attack, and to report the message to Cyber-Hub 22 if it is determined to be associated with a cyber attack. If in block 179 processor 41 determines if the message is not associated with a cyber attack processor 41 optionally proceeds to block 183 to aggregate the message ID by logging the ID to a frequency histogram and/or to store the whole message for future uploading to Cyber-Hub 22. The processor then optionally proceeds to a block 166 to return to block 152 and receive another CAN message.

If in decision block 154 processor 41 determines that instead of being unacceptable, the message ID, is acceptable, for example because it is a message ID of a white list message, processor 41 optionally proceeds to a block 156 to access vehicle context data for vehicle 30 that may be relevant to determining whether the message being vetted by Watchman 40B should be blocked. Optionally, the context data is stored as components of a context feature vector in memory 46.

Subsequently, in blocks 158 through 162, processor 41 proceeds to carry out an optionally bit by bit check of bits in the message propagating on high-speed bus 61. In block 158 processor 41 checks a first bit of the message following the message ID bits to determine a value for the first bit. In a decision block 160 the processor determines, optionally responsive to vehicle context data accessed in block 154, if the value is defective and indicates that the message is damaged or potentially damaging to nodes, such as components of control systems 62-66 connected to high-speed bus 61, and thereby to vehicle 30. If the value indicates that the bit is defective, processor 41 proceeds to block 171 to poison and block the message. If the bit is determined not to be defective, the processor proceeds to a block 162. In block 162 processor 41 determines if the last checked bit is a last bit in the message being vetted. If it is not the last bit, the processor returns to block 158 to check whether a next bit in the message is defective. Following checking of a last bit in the message and finding that the bits and the message are not defective, optionally in a block 164 processor 41 allows the message and may proceed to a block 164 to return to block 152 and receive and vet a next message.

Processor 41 may determine that a bit and thereby a message comprising the bit, are defective if the bit value and relevant vehicle context data, with or without bit values for previously checked bits indicate with a high or degree of probability, that the message contains data detrimental to effective, safe operation of vehicle 30. For example, assume a bit value in view of values for bits previously checked by processor 41 in block 158 indicates with a high degree of probability that a message propagating on high speed bus 61 comprising the bits contains an instruction to gearbox control 65 to shift to reverse. If the vehicle context data for vehicle 30 indicates that the vehicle is traveling forward at 50 kph, the message is clearly out of place and may be particularly dangerous. In such circumstances, processor 41 determines that the bit is defective and that the message should be blocked.

In the detective operating mode of Watchman 40, the Watchman operates to vet data and/or computer executable instructions, hereinafter node software of various nodes, for example ECUs that are connected to in-vehicle communication network 60. In the detective mode a Watchman 40 may cooperate with an agent, hereinafter a Watchman agent that may be incorporated in the node in accordance with an embodiment of the disclosure. The Watchman agent is configured to generate a hash of at least a portion of the node software current in the node memory when challenged by the Watchman with a challenge request to send the hash to the Watchman. The challenge request made by the Watchman may vary each time the Watchman challenges the agent, so that the anticipated hash will not be the same for all challenges. As a result a node will not be configurable by a cyber attacker to successfully answer Watchmen challenges with a same fixed and known hash. In an embodiment of the disclosure, the Watchman transmits the hash along with the associated challenge that requested the hash to Cyber-Hub 22. In an embodiment, the Cyber-Hub has a copy of the node software that the node should have and can generate a copy of the expected hash, hereinafter a hash standard, under the assumption that the node software has not been changed or tampered with relative to a correct version of the software. The Cyber-Hub compares the received hash with the hash standard and if it differs from the hash standard determines that the node firmware is damaged or has been tampered with and, optionally undertakes to have the node provided with a correct version of the firmware.

In an embodiment of the disclosure, Watchman 40 has a copy of the hash standard or receives a copy of the hash standard from Cyber-Hub 22 and compares the hash received from the Watchman agent with the hash standard. If the comparison fails the Watchman alerts Cyber-Hub 22 that the firmware is damaged and may warrant replacement. In an embodiment of the disclosure, Watchman periodically polls Watchman agents in in-vehicle communication network 60 to determine if firmware that the agents monitor have been changed or tampered with.

In an embodiment of the disclosure a Watchman 40 is hosted in an operating system of CAN in-vehicle communication network 60 and is hooked into at least one position in the operating system such as by way of example, the CAN driver, network driver and a system call such as fork ( ), exec ( ), spawn ( ) and open ( ). In the hosted detective operating mode the Watchman monitors performance of software in the operating system by receiving information provided by the hooks. The information may enable the Watchman to perform a security verification prior to performing a potentially damaging activity on the system.

For example, the Watchman may be hosted on a QNX, Linux or an Android operating system, comprised by way of example in the telematics unit 78, and it may check before allowing communication traffic on in-vehicle network 60 from a process that the process is a known process (verification may be done by using a certificate or by using a known hash of contents of the image of the process in memory and/or on disk), that its code content on disk is the same as in memory, that the running threads are all running from the code section (and not the data section), that all the dynamic libraries loaded into the process are known and allowed, that the process is allowed to access the in-vehicle network 60 and that the process was initialized by a known or allowed process and that this process is allowed to access in-vehicle network 60. For example each process in the system that wishes to communicate on the vehicle bus may be required to add a set of digitally signed rules to the configuration of the Watchman. This signed set of rules may be passed along to the Watchman using a designated API that the Watchman may expose to such processes or by placing a file containing the signed rules in the file system, next to the executable file of the relevant process.

Upon detecting a suspicious activity, the Watchman may block or allow transmission of CAN messages that it generates and/or report the activity to Cyber-Hub 22 for analysis and remedial action. A report of the activity to Cyber-Hub 22 may include data identifying the suspicious activity along with suspected binary code of the process, memory dumps and state of its threads on relevant events.

In the override operating mode, Watchman 40 may allow secure modification of its matching rules to allow particular traffic on the vehicle bus. For example, under normal operating procedure, Watchman 40A may not allow CAN messages from telematics unit 78 to control the EMU of engine control 62. However, a vehicle owner may want to be able to turn on the vehicle engine from the comfort of his or her home on a cold winter day before getting into the vehicle to drive to work. To enable this activity, Watchman 40 may be configured to be set to the override operating mode and allow the vehicle owner to turn on the engine using the owner's mobile phone. In an embodiment Watchman switches to the override mode only after receiving and verifying authenticity of a request for the override mode with permission to turn on the engine from the mobile phone. Optionally, the Watchman constrains an override mode it enables responsive to a request it receives for the override mode and a type of activity for which the override mode is requested.

For example, for enabling remote turn on of the vehicle engine, Watchman 40A may limit the override mode in time and/or number and/or contents of CAN messages it will allow from telematics unit 78 to pass through to high-speed bus 61. Optionally, it limits the remote turn on override to five minutes and to a number of CAN messages generally required to turn on the engine. Upon receiving an override instruction the Watchman may add rules to its decision tree or change its internal state to indicate that a window of opportunity has been opened for the designated particular traffic. The override mode may be used for example to allow remote diagnostic sessions in the vehicle or OTA firmware updates in the vehicle. A hosted Watchman may accept application specific override instructions.

A specific set of decision rules may be used to protect the vehicle from malicious, compromised or malfunctioning $3^{rd}$ party OBDII dongles which usually only require access to one CAN segment, and usually only require limited access to this segment. For example a Watchman may be embedded in the OBDII port of a vehicle, or in a $3^{rd}$ party OBDII dongle or be packaged as a standalone device that may be placed between the OBDII port of the vehicle and a $3^{rd}$ party dongle. Such a Watchman may be configured to only allow messages to pass from the vehicle to the dongle and not the other way around. Optionally, such a Watchman may be configured to only allow the dongle to read PIDs according to the Unified Diagnostic System Standard. Optionally such a Watchman may physically limit the $3^{rd}$ party dongle only to the specific CAN segment that it required for its normal operation, for example the High Speed bus.

There is therefore provided in accordance with an embodiment of the disclosure, a system for providing security to an in-vehicle communication network, the system comprising: a data monitoring and processing hub; and at least one module configured to communicate with the hub and be connected to a portion of a vehicle's in-vehicle network having a bus and at least one node connected to the bus, the module comprising software executable to: monitor messages in communication traffic propagating in the portion; identify an anomalous message in the monitored messages indicative of exposure of the in-vehicle network to damage from a cyber attack; take an action that affects the anomalous message in the in-vehicle network; and transmit data responsive to the message to the hub for processing.

Optionally, the at least one module is a rule based module and the software comprises: a menu of response actions that may be undertaken in response to identifying the anomalous message; and a set of matching rules that may be used as, or in establishing, a criterion for determining a response action in the menu to be undertaken by the module in response to receiving the message. Optionally, the matching rules and response actions are configured in a decision tree having branches stored in a memory of the at least one memory. Optionally, the module is configured to traverse the decision tree responsive to features of the anomalous message and navigate along a branch of the decision tree that ends at the action to be undertaken by the module in response to the anomalous message. Optionally, traversing the decision tree comprises jumping from a first to a second branch in the decision tree. Optionally, the response actions in the library comprise at least one or any combination of more than one response action chosen from: allowing the message, blocking the message, delaying the message; limiting the frequency of the message, logging the message into a memory comprised in the module; changing a component of a state feature vector representing a state of the vehicle; and/or raising an alert responsive to the message.

In an embodiment of the disclosure the matching rules comprise at least one or any combination of more than one matching rule chosen from: determine a message ID; determine a transmission frequency at which the message is transmitted in the portion of the in-vehicle network; determine a state of the vehicle; or determine a state of the in-vehicle network.

In an embodiment of the disclosure the module is configured to transmit signals to the portion of the in-vehicle network to which it is connected to alter a message it monitors so that the at least one node will discard it.

In an embodiment of the disclosure the module is configured to switch to an override operating mode in which it enables an entity outside of the in-vehicle network to communicate with a node of the in-vehicle communication network.

In an embodiment of the disclosure the system has at least one agent connected to a node of the in-vehicle communication network and configured to monitor the node. Optionally, the node comprises software responsive to which the node performs operations and the agent is configured to generate a hash of at least a portion of the software. Optionally, a module of the at least one module is configured to transmit a challenge to an agent of the at least one agent requesting that the agent transmit to the at least one module a hash of at least a portion of the node software. Optionally, the module is configured to determine if the hash received from the agent is generated responsive to a correct version of the software. Optionally, the module is configured to transmit the hash received from the agent to the hub for a determination of whether or not the hash is generated responsive to a correct version of the software.

In an embodiment of the disclosure the at least one module is configured to accumulate and store data from a plurality of messages that it monitors. Optionally, the module is configured to transmit the data that it accumulates to the hub. Additionally or alternatively the module is configured to generate at least one histogram responsive to the data. Optionally, the at least one histogram comprises at least one message frequency histogram. Optionally, the at least one message frequency histogram comprises at least one or any combination of more than one of: a message frequency histogram of message IDs; a message frequency histogram of messages transmitted to or from particular nodes connected to the in-vehicle communication network; or a message frequency comprising particular instructions or portions of the particular instructions.

In an embodiment of the disclosure the module is configured to transmit a histogram of the at least one histogram to the hub.

In an embodiment of the disclosure the module is configured to transmit a query to the hub as to whether or not the module should transmit data it has accumulated to the hub.

In an embodiment of the disclosure the hub is configured to transmit a request to the module to send data that it has accumulated to the hub.

In an embodiment of the disclosure the hub is configured to generate and transmit signals responsive to data the hub receives from the module that operate to change the software in the module. In an embodiment of the disclosure the at least one module comprises a plurality of modules. Optionally, the plurality of modules are connected to communicate with each other over a wireless local network.

In an embodiment of the disclosure the module is a software module that may be integrated with software of a node of the in-vehicle network.

In an embodiment of the disclosure the module is a hardware module comprising a physical port configured to be connected to the portion of the in-vehicle network.

In an embodiment of the disclosure the at least one module comprises a plurality of modules, each of which is connected to an in-vehicle communication system of a different vehicle. Optionally, the hub receives data from each of the plurality of modules and is configured to generate and transmit signals responsive to data that operate to change software in at least one of the plurality of modules.

There is further provided in accordance with an embodiment of the disclosure, a system for providing security to an in-vehicle communication network, the system comprising: a data monitoring and processing hub; and at least one module configured to monitor messages in communication traffic propagating in a vehicle's in-vehicle network, the network having a bus and at least one node connected to the bus, the module comprising: a communication interface configured to support communication with the hub; a memory having software comprising data characterizing messages that the at least one node transmits and receives during normal operation of the node; at least one communication port via which the module receives and transmits messages configured to be connected to a portion of the in-vehicle network; a processor that processes messages received via the port from the portion of the in-vehicle network responsive to the software in the memory to: identify an anomalous message in the received messages indicative of exposure of the in-vehicle network to damage from a cyber attack; determine an action to be taken by the module that affects the anomalous message; and transmit data responsive to the anomalous message to the hub for processing by the hub via the communication interface.

There is further provided in accordance with an embodiment of the disclosure, a module for providing security to an in-vehicle communication network having a bus and at least one node connected to the bus, the module comprising: a memory having software comprising data characterizing messages that the at least one node transmits and receives via the bus during normal operation of the node; a communication port via which the module receives and transmits messages configured to be connected to a portion of the in-vehicle network; and a processor that processes messages received via the port from the portion of the in-vehicle network responsive to the software in the memory to: identify an anomalous message in the received messages indicative of exposure of the in-vehicle network to damage from a cyber attack; and cause the module to transmit at least one signal via the port to the portion of the in-vehicle network that alters the anomalous message so that the at least one node will discard it.

There is further provided in accordance with an embodiment of the disclosure, Apparatus for providing security to an in-vehicle communication network having a bus and at least one node connected to the bus and having software responsive to which the node performs operations, the apparatus comprising: a first module configured to be connected to the at least one node and generate and transmit a hash of at least a portion of the node software in response to receiving a challenge; and a second module configured to be connected to the in-vehicle network and transmit a challenge to the first module requesting that the first module generate and transmit a hash of the at least a portion of the node software to the second module; wherein the second module is configured to determine if the hash received from the first module is generated responsive to a correct version of the node software.

There is further provided in accordance with an embodiment of the disclosure an in-vehicle communication network comprising: a bus and at least one node connected to the bus a an in-vehicle network operating system (OS) that manages OS processes, a secondary memory in which process codes for the processes are stored, and a primary memory, into which the OS loads a copy of a process code of a process to enable a processor to run the process and execute the process code; and a module hosted in the OS and having a hook in at least one position of the OS that provides information to the module responsive to operation of the OS that the module processes in accordance with executable instructions that the module comprises to determine if the in-vehicle OS is operating properly. Optionally, the at least one position in the OS comprises at least one or any combination of more than one of: a fork ( ), exec ( ), spawn ( ), or open ( ).

Additionally or alternatively processing the information comprises determining if a copy of a process code in the primary memory being run by the processor and generating communication messages for transmission via the in-vehicle communication network is a copy of process code of a known process. Optionally, processing the information comprises determining if the copy of the process code in the primary memory being run by the processor is substantially the same as the copy of the process code in the secondary memory. Additionally or alternatively processing the information comprises determining if all running threads of the process code in primary memory are running from the code section of the copy of the process code and not from data stored in the primary or secondary memory. In an embodiment of the disclosure processing the information comprises determining if all dynamic libraries associated with the process code being run from the primary memory are known and allowed. In an embodiment of the disclosure processing the information the OS is an OS chosen from the group consisting of: QNX, Linux, or an Android OS.

In an embodiment of the disclosure, the module executable instructions and/or data are configured to: monitor messages in communication traffic propagating in the in-vehicle network; identify an anomalous message in the monitored messages indicative of exposure of the in-vehicle network to damage from a cyber attack; and take an action that affects the anomalous message in the in-vehicle network.

Optionally, the module is a rule based module and comprises: a menu of response actions that may be undertaken in response to identifying the anomalous message; and a set of matching rules that may be used as, or in establishing, a criterion for determining a response action in the menu to be undertaken by the module in response to receiving the message.

Optionally, the matching rules and response actions are configured in a decision tree having branches and the module is configured to traverse the decision tree responsive to features of the anomalous message and navigate along a branch of the decision tree that ends at the action to be undertaken by the module in response to the anomalous message.

Additionally or alternatively, the response actions in the library comprise at least one or any combination of more than one response action chosen from: allowing the message, blocking the message, delaying the message; limiting the frequency of the message, logging the message into a memory comprised in the module; changing a component of a state feature vector representing a state of the vehicle; and/or raising an alert responsive to the message.

In an embodiment of the disclosure, the matching rules comprise at least one or any combination of more than one matching rule chosen from: determine a message ID; determine a transmission frequency at which the message is transmitted in the portion of the in-vehicle network; determine a state of the vehicle; or determine a state of the in-vehicle network.

There is further provided in accordance with an embodiment of the disclosure a system comprising: a data monitoring and processing hub; a plurality of in-vehicle communication networks each configured to communicate with the hub and transmit to the hub data responsive to the OS if the module determines that the OS is not operating properly. Optionally, the hub is configured to process data received from an in-vehicle network of the plurality of in-vehicle networks to generate and transmit signals to at least one of the plurality of in-vehicle networks that changes the executable instructions in the in-vehicle network's module.

In the description and claims of the present application, each of the verbs, "comprise" "include" and "have", and conjugates thereof, are used to indicate that the object or objects of the verb are not necessarily a complete listing of components, elements or parts of the subject or subjects of the verb. And unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. In addition the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to persons of the art. The scope of the invention is limited only by the claims.

The invention claimed is:

1. An in-vehicle communication network comprising: a bus and at least one node connected to the bus; an in-vehicle network operating system (OS) that manages OS processes, to enable a processor to run the processes and execute their respective process codes; and a module hosted in the OS that is configured to monitor the OS and vet a process that the OS enables for running by a processor to determine if the process is potentially damaging.

2. The in-vehicle communication network according to claim 1 wherein the module is configured to prevent the process from having access to the network bus if the process is determined to be potentially damaging.

3. The in-vehicle communication network according to claim 1 wherein the module has a hook in at least one position of the OS that provides information to the module responsive to operation of the OS that the module processes to monitor the OS, the at least one position comprising at least one or any combination of more than one of: a fork ( ), exec ( ), spawn ( ), or open ( ).

4. The in-vehicle communication network according to claim 3 wherein processing the information comprises determining if all running threads of the process code being run are running from the code section of the process code.

5. The in-vehicle communication network according to claim 1 wherein vetting the process comprises determining if a copy of a process code of the process being run by the processor is a copy of process code of a known process.

6. The in-vehicle communication network according to claim 5 wherein determining if the copy is a copy of a known process comprises determining validity of a digital signature associated with the process.

7. The in-vehicle communication network according to claim 5 wherein vetting the process comprises determining if the copy of the process code being run by the processor is substantially the same as the copy of the process code in a secondary memory comprised in the in-vehicle network in which process codes for the processes are stored.

8. The in-vehicle communication network according to claim 7 wherein vetting the process comprises determining if all dynamic libraries associated with the copy of the process code being run are known and allowed.

9. The in-vehicle communication network according to claim 1 wherein the OS is an OS chosen from the group consisting of: QNX, Linux, or an Android OS.

* * * * *